United States Patent
Ezrielev et al.

(10) Patent No.: US 12,430,457 B2
(45) Date of Patent: Sep. 30, 2025

(54) REVERSING SYMMETRIC ENCRYPTIONS USING KEYS FOUND IN SNAPSHOTS—PER-FILE KEYS, RANDOM AND TRANSMITTED OUTSIDE

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 18/297,118

(22) Filed: Apr. 7, 2023

(65) Prior Publication Data

US 2024/0338472 A1    Oct. 10, 2024

(51) Int. Cl.
  *G06F 21/00* (2013.01)
  *G06F 21/56* (2013.01)
  *G06F 21/62* (2013.01)
  *H04L 9/08* (2006.01)

(52) U.S. Cl.
  CPC ........ *G06F 21/6218* (2013.01); *G06F 21/566* (2013.01); *H04L 9/0822* (2013.01)

(58) Field of Classification Search
  CPC .. G06F 21/6218; G06F 21/566; G06F 21/568; G06F 21/554; H04L 9/0822
  See application file for complete search history.

(56) References Cited

U.S. PATENT DOCUMENTS

| | | | |
|---|---|---|---|
| 11,349,855 B1 * | 5/2022 | Amit | G06F 9/547 |
| 11,663,336 B1 * | 5/2023 | Armangau | G06F 21/60 |
| | | | 726/23 |
| 2018/0114020 A1 | 4/2018 | Hirschberg et al. | |
| 2018/0157834 A1 * | 6/2018 | Continella | G06F 21/568 |
| 2018/0351969 A1 * | 12/2018 | MacLeod | G06F 11/2038 |
| 2019/0018961 A1 * | 1/2019 | Kostyushko | H04L 9/002 |
| 2019/0109869 A1 | 4/2019 | Bailey | |
| 2023/0060606 A1 * | 3/2023 | Dubey | G06F 11/076 |

FOREIGN PATENT DOCUMENTS

| | | | | |
|---|---|---|---|---|
| GB | 2627941 A | * | 5/2022 | ........... G06F 21/566 |
| KR | 10-2022-0098952 A | | 7/2022 | |

OTHER PUBLICATIONS

Bajpai. P. et al., "Attacking key management in ransomware," IT Professional, vol. 22, Issue 2, 2020, pp. 21-27.

* cited by examiner

*Primary Examiner* — Tri M Tran
(74) *Attorney, Agent, or Firm* — Workman Nydegger

(57) ABSTRACT

One example method includes identifying a process that includes both a write operation and a transmit operation, wherein the write operation comprises performing a malicious process on data that renders the data unusable to an owner of the data, and the transmit operation comprises transmitting the data after the data has been acted upon by the malicious process, performing a snapshot operation to create a snapshot that comprises a copy of the data after the data has been acted upon by the malicious process and/or while the data is being acted upon by the malicious process, and intercepting the data before, or while, the transmit operation is performed.

18 Claims, 4 Drawing Sheets

REVERSING SYMMETRIC ENCRYPTIONS USING KEYS FOUND IN SNAPSHOTS—PER-FILE KEYS, RANDOM AND TRANSMITTED OUTSIDE

FIELD OF THE INVENTION

Embodiments of the present invention generally relate to the detection of ransomware. More particularly, at least some embodiments of the invention relate to systems, hardware, software, computer-readable media, and methods, for decrypting data that was encrypted by an attacker.

BACKGROUND

Many ransomware processes include an encryption component that operates to encrypt target data. The encryption of the data prevents the data owner from using the data until a ransom is paid to the attacker, who may then provide the data owner with a key to decrypt the data. Thus, without the key, the data is unusable by the data owner, and the business and other operations of the owner may be significantly compromised.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
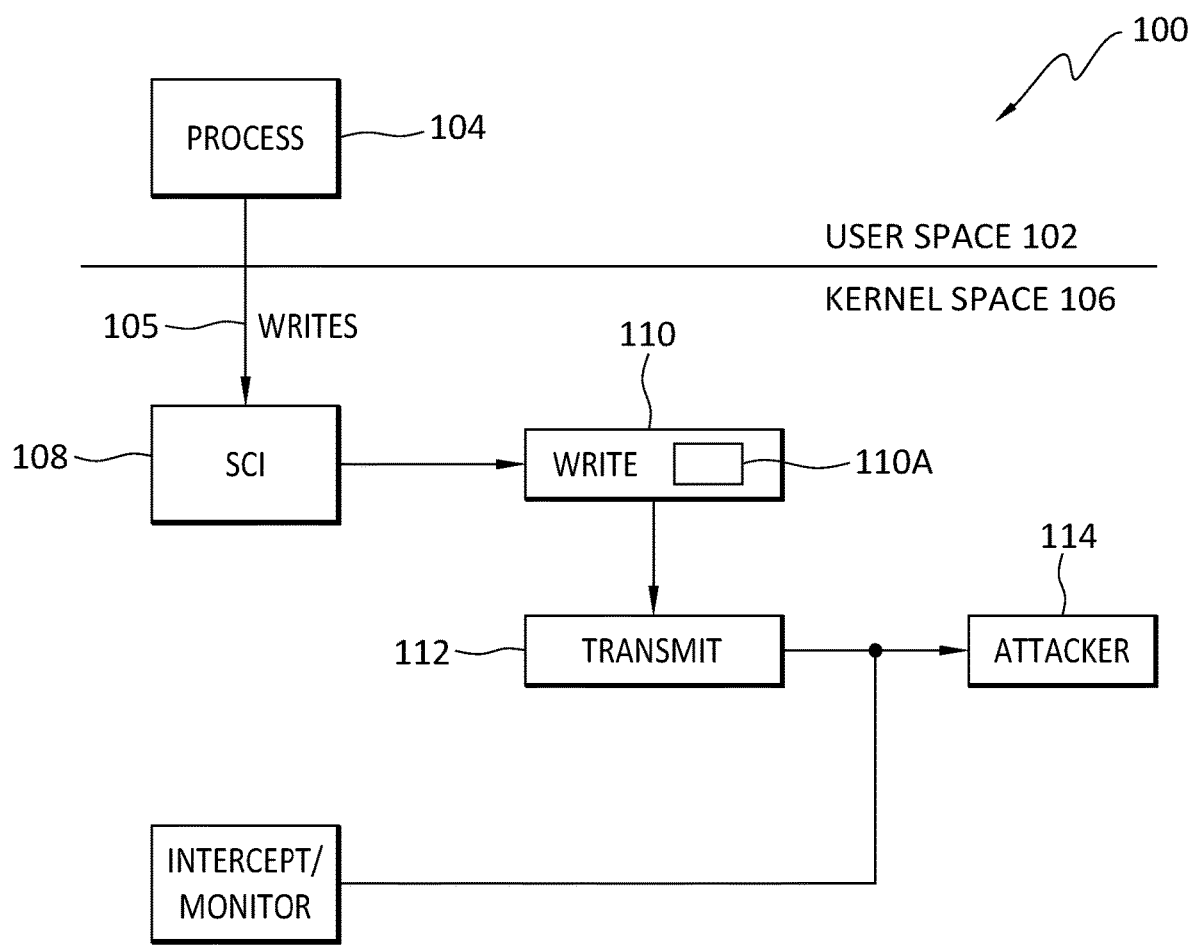
FIG. 1 discloses aspects of an example architecture and operating environment according to an embodiment.

Embodiments of the present invention generally relate to the detection of ransomware. More particularly, at least some embodiments of the invention relate to systems, hardware, software, computer-readable media, and methods, for decrypting data that was encrypted by an attacker.

A ransomware process may encrypt data using a key, and may then transmit the encrypted data and the key to the attacker. An embodiment of the invention, which may monitor processes that write and transmit data, may intercept the encrypted data and the key. In this way, the data may be decrypted by the data owner. As such, in an embodiment, the ransomware process may be allowed to continue to encrypt the data in order to enable the data owner to analyze the ransomware process. That is, because the owner has the key(s) to the encrypted data, there may be little or no harm in allowing the ransomware process to continue to encrypt the data for a time so that the ransomware process can be analyzed. After completion of the analysis, the ransomware process may be disabled, such as by disabling writes by the ransomware process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that operations implemented by a ransomware process may be leveraged to enable analysis, and disabling, of the ransomware process. An embodiment may enable a data owner to decrypt data, without paying a ransom, that has been encrypted by ransomware. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations.

More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In an embodiment, the operating environment 100 may comprise a Linux® environment, although that is not required, and embodiments of the invention may be implemented in other environments as well. Thus, while reference is made herein to the example of a Linux® environment, such reference is for the purposes of illustration, and is not intended to limit the scope of the invention in any way.

The example operating environment 100 may comprise a user space 102 in which one or more applications or processes 104 are running. One or more of the processes 104 may be a ransomware process, or a suspected ransomware process. The processes 104 may communicate writes 105 to a user space 106. In the case where a process 104 is a ransomware process, one or more of the writes 105 may comprise a request to encrypt the data to which the write 105 is directed. In an embodiment, the writes 105 may be received by an SCI 108 (system call interface), in the Linux® example. The SCI 108 may control the writing 110 to the data, and the transmission 112 of the data that has been written 110 to. If the process 104 is a ransomware process, the writing 110 of the data may comprise encrypting the data using a key 110a. In some instances, the nature of the structure and operation of the ransomware may be such that each file or other grouping of data, is encrypted by the ransomware with a respective key 110a. In any case, data that has been written 110 to, that is, encrypted, may be transmitted 112 to an attacker 114 that controls the operation of the process 104.

In an embodiment of the invention, an interception/monitoring module (IMM) 116 may reside in the kernel space 106 and may operate to monitor and intercept transmissions 112 by the ransomware. That is, the IMM 116 may intercept encrypted data and keys transmitted by the ransomware to the attacker 114. In an embodiment, this interception may comprise taking a snapshot, by the IMM 116, of the encrypted data and the keys. This interception process may not be visible to the ransomware process or to the attacker 114. Thus, the attacker 114 may be unaware that the IMM 116 is snapshotting the encrypted data and the keys. In this way, an embodiment may perform, such as by way of the IMM 116, the monitoring and interception processes without alerting the ransomware process or the attacker 114.

B. Example Functional/Operational Aspects of an Embodiment

Figure 2:
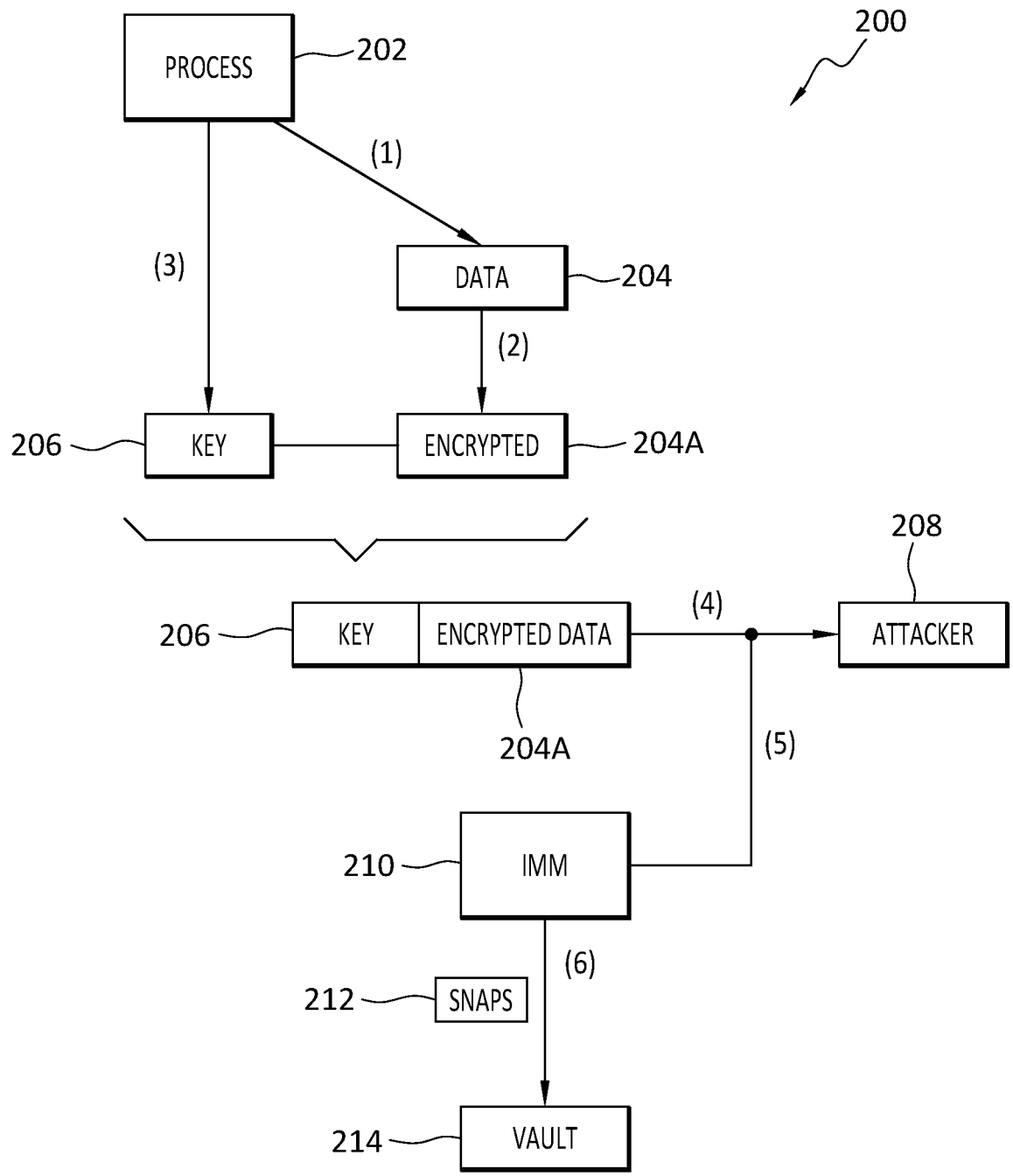
FIG. 2 discloses aspects of the functions and operation of an embodiment.

With attention now to FIG. 2, an example functional diagram 200 according to one embodiment is disclosed. As shown, a process 202 may issue (1) a write to data 204. Where the process 202 is a ransomware process, the write (1) may comprise encryption of the data 204 to produced encrypted data 204A. A key 206 used by the process 202 to encrypt (1) the data may be associated (3) by the process 202 with the encrypted data 204A. The encrypted data 204A and associated key 206 may be transmitted (4), at the direction of the process 202, to an attacker 208 which may control the process 202. The key 206 may be generated randomly, and on a per-file basis, by the process 202. In some instances encryption (1) of the data 204 by the process 202 may comprise symmetric encryption, that is, a process in which the same key is used to encrypt, and decrypt, the data 204.

Because the attacker 208 is typically outside of the system where the process 202 operates, and where the attacked data 204 resides, an embodiment may detect suspected ransomware processes by noting which write processes (1) are associated with a subsequent transmission (4) to an entity outside of the system. In some cases, the write (1) and the transmission (4) may be elements of the same, single, process 202. That is, the process 202 may include both a 'write' component and a 'transmit' component, and at last the 'transmit' component of any such processes may be intercepted, as discussed elsewhere herein.

In some instances, the key 206 may be transmitted by the process 202 separately from the encrypted data 204A. However, the key 206 may comprise an indication identifying the file(s), or other groupings of data 204, that were encrypted with the key 206. Thus, an entity possessing both the key 206 and the encrypted data 204A would still be able to decrypt the encrypted data 204A with the key(s) 206.

As noted earlier herein, some implementations of the process 202 may use a different respective key 206 for each grouping of data 204 that is to be encrypted. An IMM 210, such as may be implemented and operated by the owner of the data 204, may monitor (5) the transmissions (4) and take snapshots 212 of the encrypted data 204A and key(s) 206 that are being transmitted (4). In an embodiment, the snapshots 212 may be stored (6) in a vault 214, such as a sandbox that is isolated from any components or systems outside the vault 214, or other site for further evaluation.

Note that because the snapshots may include both the encrypted data 204A and the key 206 that was used by the process 202 to encrypt the data 204, the data owner may be able to decrypt the encrypted data 204A. As a result, the process 202 may not necessarily present an immediate threat to the data 204, and the data owner may accordingly be able to evaluate the structure and operation of the process 202 by allowing the process 202 continue to operate for a time, and then implement appropriate action(s) to disable the process 202, such as disabling write operations (3) by the process 202.

In an embodiment, a snapshot operation may comprise taking one or more snapshots of an encryption process, and/or a data transmission process, such as while the process or processes are being performed. The snapshot(s) thus generated, like the other snapshots disclosed herein, may then be searched for a key that was used to encrypt the data.

Note that an encryption process is one example of a malicious process that operates to render the data, upon which the process was performed, unusable to the owner of the data. Thus, the scope of the invention is not limited solely to encryption operations.

C. Example Methods

Figure 3:
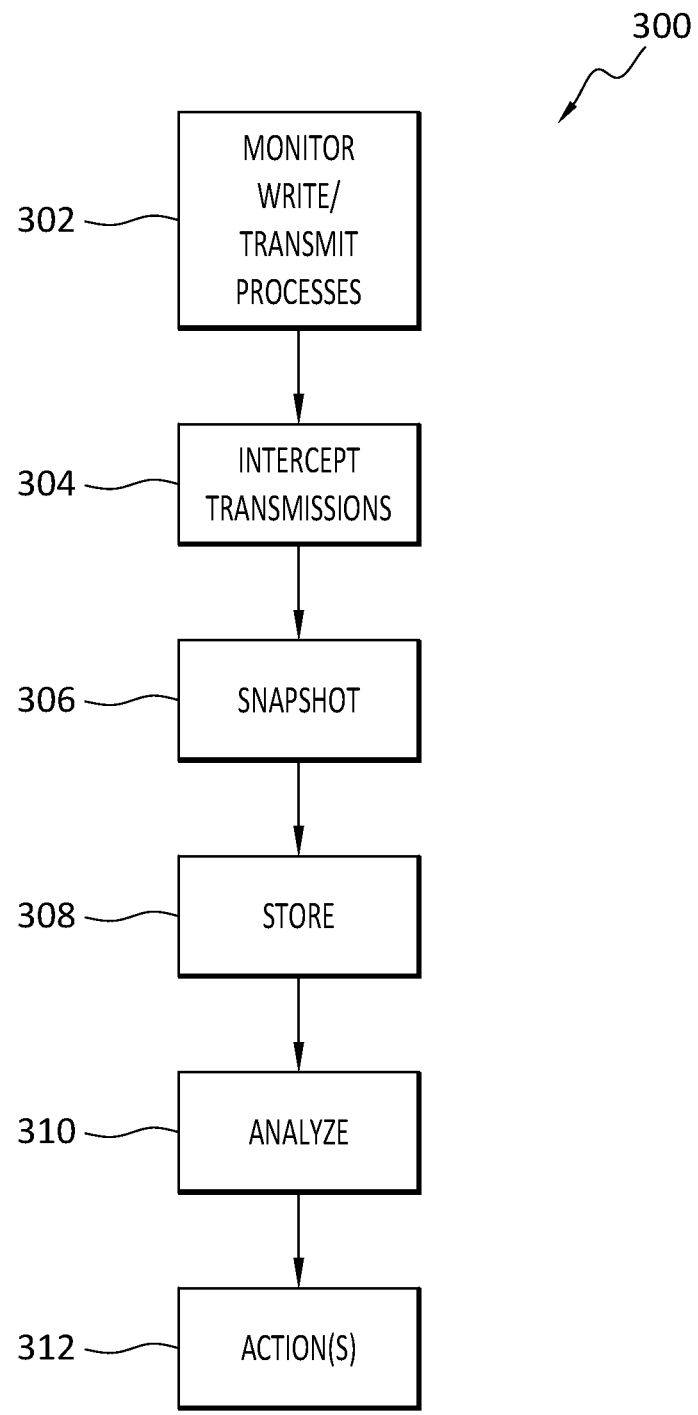
FIG. 3 discloses an example method according to one embodiment.

It is noted with respect to the disclosed methods, including the example method of FIG. 3, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

In some instances, sophisticated ransomware may operate to generate a random single key for each file encryption, and following the encryption of the file, transmit the encrypted file back to the attacker, along with an indication of the file that was encrypted with that key. For such processes that write to data, and then transmit the encrypted data, key, and other information, to an external entity, and embodiment may intercept and snapshot the data and the key. Note that an embodiment may not stop the encryption being performed by the ransomware at this point as it may be decided to gather more information about the ransomware. Because the data owner who intercepted the encrypted data and key is able to decrypt the encrypted data with the intercepted key, it may be expected that the ransomware will be unable to make the data unusable to the user. Even if the ransomware initially succeeds in encrypting and transmitting some data, without detection, once the process performing the encryption/transmission is detected, further damage by the ransomware may be reduced, or eliminated. In this way, an embodiment may operate to extend the ability to decrypt files, without paying to ransom a key, that have been encrypted by an attacker.

Directing attention now to FIG. 3, an example method according to one embodiment is denoted generally at 300. The method 300 may begin with the monitoring of processes to identify processes that include both a 'write' component as well as a 'transmit' component, that is, a 'transmit' component that transmits the data that was written to, to an external entity. In an embodiment, a process that comprises such a 'write' component and such a 'transmit' component may be presumed to constitute a ransomware process.

The 'transmit' components of such processes may be intercepted 304. In an embodiment, the interception 304 may not be apparent to the process that includes the 'write' and 'transmit' components. As such, an embodiment of the invention may operate in such a way as to avoid alerting the process that includes the 'write' component that the interception 304 is taking place, or has taken place. In an embodiment, the interception 304 may, or may not, take place the first time that a process performs both write and transmit operations.

When a process of interest has been identified, such as because that process includes both a 'write' and 'transmit' (to an external entity) component, one or more snapshots may be taken 306 of the encrypted data and keys that have been transmitted by the process. In an embodiment, a snapshot may comprise both encrypted data, and the key that was used to encrypt that data. Note that it may not necessarily be known how to identify the key(s) in advance, that is, before a snapshot is taken. As such, an embodiment may snapshot an encryption operation, as well as the associated data that was encrypted and/or is being encrypted, and then search the snapshot(s) for the key(s) needed to decrypt the data. In an embodiment, one or more snapshots may be taken of data that has been transmitted by a ransomware process and/or of data that has been encrypted by a ransomware process but not transmitted by the ransomware process. This may be a useful approach in circumstances in which the ransomware does not repeatedly transmit keys out with the encrypted data. The snapshots may be stored 308 in a vault or other secure site.

Thus, because a data owner, which may have performed the interception 304 and taken the snapshots 306, may possess the key to the encrypted data, as well as possess a copy of the encrypted data, the data owner may be able to decrypt the encrypted data using the key. In this way, the data owner may be able to avoid paying a ransom to an attacker to obtain the key. Because the data owner thus effectively has access to its data, the encryption operation of the process may be allowed to continue to run for a time so that the process can be analyzed 310. Depending, or not, upon the outcome of the analysis 310, one or more actions 312 may be taken. For example, one such action 312 may be to disable further writes by the process that encrypted the data.

A number of variations to the example method 300 may be implemented. For example, rather than allowing a process to encrypt data, an embodiment may simulate the encryption of the data so that, from the perspective of the process, which may be a ransomware process, encryption is being performed as expected. In an embodiment, the transmission of encrypted data, as may be expected to be performed by a ransomware process, may simply be prevented, or simulated so that it appears to the ransomware process that encrypted data has been transmitted to an attacker. In an embodiment, simulated encrypted data may be transmitted out, that is, data that has been encrypted with a key controlled by the data owner. In this way, it may appear to the ransomware process that operations are proceeding as expected, such that no alert would be raised to the attacker.

D. Further Example Embodiments

Following are some further example embodiments of the invention. These are presented only by way of example and are not intended to limit the scope of the invention in any way.

Embodiment 1. A method, comprising: identifying a process that includes both a write operation and a transmit operation, wherein the write operation comprises performing a malicious process on data that renders the data unusable to an owner of the data, and the transmit operation comprises transmitting the data after the data has been acted upon by the malicious process; performing a snapshot operation to create a snapshot that comprises a copy of the data after the data has been acted upon by the malicious process and/or while the data is being acted upon by the malicious process; and intercepting the data before, or while, the transmit operation is performed.

Embodiment 2. The method as recited in any preceding embodiment, wherein the malicious process performed on the data is a symmetric encryption process.

Embodiment 3. The method as recited in any preceding embodiment, wherein the snapshot comprises a snapshot of the malicious process as the malicious process is being performed.

Embodiment 4. The method as recited in any preceding embodiment, wherein the process comprises a ransomware process.

Embodiment 5. The method as recited in any preceding embodiment, wherein the snapshot comprises a snapshot of the transmit operation as the transmit operation is being performed.

Embodiment 6. The method as recited in any preceding embodiment, wherein the malicious process is allowed to continue to run for a period of time after the snapshot is created.

Embodiment 7. The method as recited in any preceding embodiment, wherein the data comprises a file, and the malicious process comprises encrypting the file with a key specific to the file.

Embodiment 8. The method as recited in any preceding embodiment, wherein the snapshot is searched for a key that was used by the malicious process to encrypt the data.

Embodiment 9. The method as recited in any preceding embodiment, wherein the malicious process comprises encrypting the data using a key, and the transmit operation transmits the encrypted data and the key to an attacker associated with the process.

Embodiment 10. The method as recited in any preceding embodiment, wherein the intercepting prevents the transmit operation from being performed.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
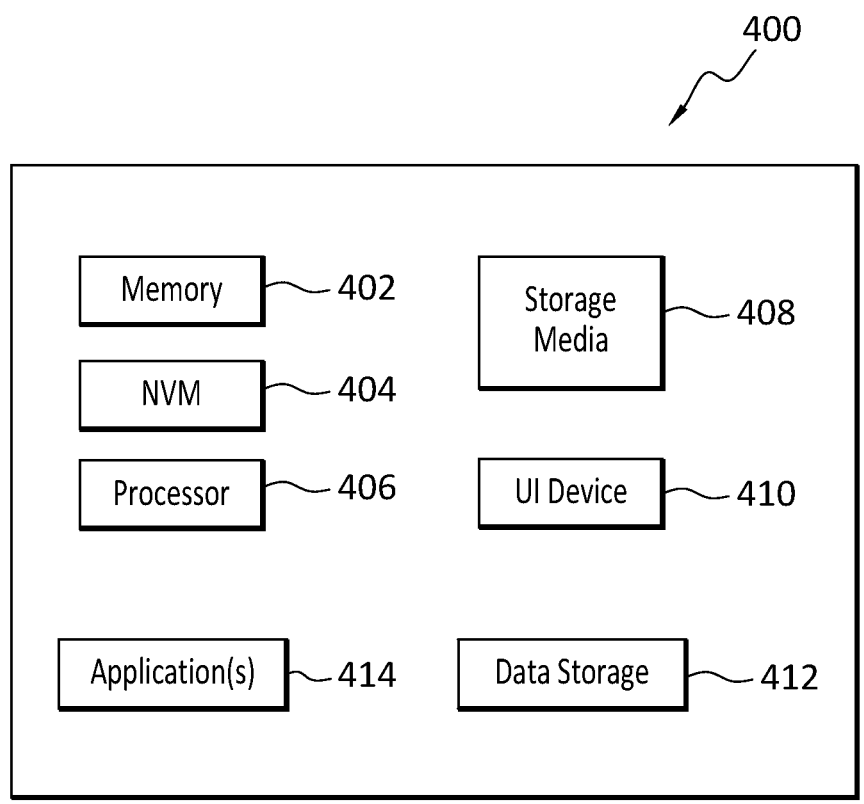
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    in a kernel space, identifying a process taking place in the kernel space that includes both a write operation and a transmit operation, wherein the write operation comprises performing a malicious process on data that renders the data unusable to an owner of the data, and the transmit operation comprises transmitting, out of the kernel space to an attacker, the data after the data has been acted upon by the malicious process;
    performing a snapshot operation to create a snapshot that comprises a copy of the data after the data has been acted upon by the malicious process and/or while the data is being acted upon by the malicious process;
    searching the snapshot for a key that was used by the malicious process to encrypt the data; and
    intercepting the data before, or while, the transmit operation is performed.

2. The method as recited in claim 1, wherein the malicious process performed on the data is a symmetric encryption process.

3. The method as recited in claim 1, wherein the snapshot comprises a snapshot of the malicious process as the malicious process is being performed.

4. The method as recited in claim 1, wherein the process comprises a ransomware process.

5. The method as recited in claim 1, wherein the snapshot comprises a snapshot of the transmit operation as the transmit operation is being performed.

6. The method as recited in claim 1, wherein the malicious process is allowed to continue to run for a period of time after the snapshot is created.

7. The method as recited in claim 1, wherein the data comprises a file, and the malicious process comprises encrypting the file with the key, and the key is specific to the file.

8. The method as recited in claim 1, wherein the malicious process comprises encrypting the data using the key, and the transmit operation transmits the encrypted data and the key to the attacker.

9. The method as recited in claim 1, wherein the intercepting prevents the transmit operation from being performed.

10. A non-transitory storage medium having stored therein instructions that are executable by one or more hardware processors to perform operations comprising:

in a kernel space, identifying a process taking place in the kernel space that includes both a write operation and a transmit operation, wherein the write operation comprises performing a malicious process on data that renders the data unusable to an owner of the data, and the transmit operation comprises transmitting, out of the kernel space to an attacker, the data after the data has been acted upon by the malicious process;

performing a snapshot operation to create a snapshot that comprises a copy of the data after the data has been acted upon by the malicious process and/or while the data is being acted upon by the malicious process;

searching the snapshot for a key that was used by the malicious process to encrypt the data; and intercepting the data before, or while, the transmit operation is performed.

11. The non-transitory storage medium as recited in claim 10, wherein the malicious process performed on the data is a symmetric encryption process.

12. The non-transitory storage medium as recited in claim 10, wherein the snapshot comprises a snapshot of the malicious process as the malicious process is being performed.

13. The non-transitory storage medium as recited in claim 10, wherein the process comprises a ransomware process.

14. The non-transitory storage medium as recited in claim 10, wherein the snapshot comprises a snapshot of the transmit operation as the transmit operation is being performed.

15. The non-transitory storage medium as recited in claim 10, wherein the malicious process is allowed to continue to run for a period of time after the snapshot is created.

16. The non-transitory storage medium as recited in claim 10, wherein the data comprises a file, and the malicious process comprises encrypting the file with the key, and the key is specific to the file.

17. The non-transitory storage medium as recited in claim 10, wherein the malicious process comprises encrypting the data using the key, and the transmit operation transmits the encrypted data and the key to the attacker.

18. The non-transitory storage medium as recited in claim 10, wherein the intercepting prevents the transmit operation from being performed.

* * * * *